US007224798B2

(12) United States Patent
Pinder et al.

(10) Patent No.: US 7,224,798 B2
(45) Date of Patent: May 29, 2007

(54) METHODS AND APPARATUS FOR PROVIDING A PARTIAL DUAL-ENCRYPTED STREAM IN A CONDITIONAL ACCESS OVERLAY SYSTEM

(75) Inventors: Howard G. Pinder, Norcross, GA (US); William D. Woodward, Jr., Lilburn, GA (US); Jonathan Bradford Evans, Atlanta, GA (US); Anthony J. Wasilewski, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 479 days.

(21) Appl. No.: 10/629,839

(22) Filed: Jul. 30, 2003

(65) Prior Publication Data

US 2004/0139337 A1 Jul. 15, 2004

Related U.S. Application Data

(63) Continuation-in-part of application No. 10/602,986, filed on Jun. 25, 2003, and a continuation-in-part of application No. 10/602,987, filed on Jun. 25, 2003, and a continuation-in-part of application No. 10/602, 988, filed on Jun. 25, 2003, which is a continuation of application No. 09/930,901, filed on Aug. 16, 2001, now Pat. No. 6,937,729, which is a continuation of application No. 09/487,076, filed on Jan. 19, 2000, now Pat. No. 6,292,568, which is a continuation of application No. 09/126,783, filed on Jul. 31, 1998, now abandoned, and a continuation-in-part of application No. 09/111,958, filed on Jul. 8, 1998, now abandoned, and a continuation-in-part of application No. 08/767,535, filed on Dec. 16, 1996, now Pat. No. 6,005,938, and a continuation-in-part of application No. 08/580,759, filed on Dec. 29, 1995, now Pat. No. 5,870,474, and a continuation-in-part of application No. 08/415,617, filed on Apr. 3, 1995, now Pat. No. 5,742,677.

(60) Provisional application No. 60/054,575, filed on Aug. 1, 1997, provisional application No. 60/054,578, filed on Aug. 1, 1997, provisional application No. 60/007, 962, filed on Dec. 4, 1995.

(51) Int. Cl.

| | |
|---|---|
| ***H04N 7/167*** | (2006.01) |
| *H04K 1/00* | (2006.01) |
| *H04L 9/00* | (2006.01) |
| *H04L 9/32* | (2006.01) |
| *G06F 11/30* | (2006.01) |
| *G06F 12/14* | (2006.01) |
| *G06K 9/36* | (2006.01) |
| *G06K 9/46* | (2006.01) |

(52) U.S. Cl. ...................... 380/239; 713/189; 713/193; 713/194; 380/200; 380/201; 380/202; 380/210; 380/211; 380/212; 380/213; 382/232

(58) Field of Classification Search ..................... None
See application file for complete search history.

(56) References Cited

U.S. PATENT DOCUMENTS

| | | | |
|---|---|---|---|
| 4,155,042 | A | 5/1979 | Permut et al. |
| 4,358,672 | A | 11/1982 | Hyatt et al. |
| 4,388,643 | A | 6/1983 | Aminetzah |
| 4,405,829 | A | 9/1983 | Rivest et al. |
| 4,531,020 | A | 7/1985 | Weschselberger et al. |
| 4,600,921 | A | 7/1986 | Thomas et al. |
| 4,613,901 | A | 9/1986 | Gilhousen et al. |
| 4,634,807 | A | 1/1987 | Chorley et al. |
| 4,649,533 | A | 3/1987 | Chorley et al. |
| 4,658,093 | A | 4/1987 | Hellman |
| 4,712,238 | A | 12/1987 | Gilhousen et al. |
| 4,712,239 | A | 12/1987 | Frezza |
| 4,736,422 | A | 4/1988 | Mason |
| 4,823,385 | A | 4/1989 | Hegendörfer |
| 4,864,615 | A | 9/1989 | Bennett et al. |
| 4,866,770 | A | 9/1989 | Seth-Smith et al. |
| 4,885,777 | A | 12/1989 | Takaragi et al. |
| 4,887,296 | A | 12/1989 | Horne |
| RE33,189 | E | 3/1990 | Lee et al. |
| 4,912,762 | A | 3/1990 | Lee et al. |

| | | | | | |
|---|---|---|---|---|---|
| 4,982,430 | A | | 1/1991 | Frezza et al. | |
| 4,993,068 | A | | 2/1991 | Piosenka et al. | |
| 5,003,591 | A | | 3/1991 | Kauffman | |
| 5,018,196 | A | | 5/1991 | Takaragi et al. | |
| 5,029,207 | A | | 7/1991 | Gammie | |
| 5,036,537 | A | | 7/1991 | Jeffers et al. | |
| 5,073,935 | A | | 12/1991 | Pastor | |
| RE33,808 | E | | 1/1992 | Wright, Jr. | |
| 5,124,117 | A | | 6/1992 | Tatebayashi et al. | |
| 5,142,578 | A | | 8/1992 | Matyas et al. | |
| 5,144,669 | A | * | 9/1992 | Faulkner et al. | 380/212 |
| 5,151,782 | A | | 9/1992 | Ferraro | |
| 5,155,591 | A | | 10/1992 | Wachob | |
| 5,175,765 | A | | 12/1992 | Perlman | |
| 5,231,665 | A | | 7/1993 | Auld et al. | |
| 5,235,643 | A | | 8/1993 | Anderson et al. | |
| 5,237,610 | A | | 8/1993 | Gammie et al. | |
| 5,243,652 | A | | 9/1993 | Teare et al. | |
| 5,249,230 | A | | 9/1993 | Mihm, Jr. | |
| 5,270,822 | A | | 12/1993 | Choi | |
| 5,282,248 | A | | 1/1994 | DeJoy | |
| 5,282,249 | A | | 1/1994 | Cohen et al. | |
| 5,285,497 | A | | 2/1994 | Thatcher, Jr. | |
| 5,301,233 | A | | 4/1994 | Coutrot et al. | |
| 5,341,425 | A | | 8/1994 | Wasilewski et al. | |
| 5,343,527 | A | | 8/1994 | Moore | |
| 5,381,477 | A | | 1/1995 | Beyers, III et al. | |
| 5,381,481 | A | | 1/1995 | Gammie et al. | |
| 5,400,401 | A | | 3/1995 | Wasilewski et al. | |
| 5,402,490 | A | | 3/1995 | Mihm, Jr. | |
| 5,414,773 | A | | 5/1995 | Handelman | |
| 5,418,782 | A | | 5/1995 | Wasilewski | 370/73 |
| 5,420,866 | A | | 5/1995 | Wasilewski | 370/110.1 |
| 5,425,101 | A | | 6/1995 | Woo et al. | |
| 5,432,542 | A | | 7/1995 | Thibadeau et al. | |
| 5,440,633 | A | | 8/1995 | Augustine et al. | |
| 5,465,299 | A | | 11/1995 | Matsumoto et al. | |
| 5,473,692 | A | | 12/1995 | Davis | |
| 5,481,542 | A | | 1/1996 | Logston et al. | |
| 5,481,613 | A | | 1/1996 | Ford et al. | |
| 5,488,410 | A | | 1/1996 | Lieberfarb et al. | |
| 5,497,422 | A | | 3/1996 | Tysen et al. | |
| 5,499,294 | A | | 3/1996 | Friedman | |
| 5,499,295 | A | | 3/1996 | Cooper | |
| 5,506,904 | A | | 4/1996 | Sheldrick et al. | |
| 5,509,073 | A | | 4/1996 | Monnin et al. | |
| 5,519,780 | A | | 5/1996 | Woo et al. | |
| 5,524,052 | A | | 6/1996 | Augustine et al. | |
| 5,550,984 | A | | 8/1996 | Gelb | |
| 5,557,678 | A | | 9/1996 | Ganesan | |
| 5,557,765 | A | | 9/1996 | Lipner et al. | |
| 5,559,889 | A | | 9/1996 | Easter et al. | |
| 5,563,950 | A | | 10/1996 | Easter et al. | |
| 5,565,909 | A | | 10/1996 | Thibadeau et al. | |
| 5,568,552 | A | | 10/1996 | Davis | |
| 5,568,554 | A | | 10/1996 | Eastlake, 3rd | |
| 5,583,939 | A | | 12/1996 | Chang et al. | |
| 5,588,058 | A | | 12/1996 | Le Berre | |
| 5,590,202 | A | | 12/1996 | Bestler et al. | |
| 5,621,793 | A | | 4/1997 | Bednarek et al. | |
| 5,671,276 | A | | 9/1997 | Eyer et al. | |
| 5,675,649 | A | | 10/1997 | Brennan et al. | |
| 5,740,246 | A | | 4/1998 | Saito | |
| 5,742,677 | A | | 4/1998 | Pinder et al. | |
| 5,764,770 | A | | 6/1998 | Schipper et al. | |
| 5,787,172 | A | | 7/1998 | Arnold | |
| 5,857,020 | A | | 1/1999 | Peterson, Jr. | |
| 5,862,220 | A | | 1/1999 | Perlman | |
| 5,870,474 | A | | 2/1999 | Wasilewski et al. | |
| 5,920,626 | A | | 7/1999 | Durden et al. | |
| 6,005,938 | A | | 12/1999 | Banker et al. | |
| 6,009,116 | A | | 12/1999 | Bednarek et al. | 375/200 |
| 6,105,134 | A | | 8/2000 | Pinder et al. | |
| 6,108,365 | A | | 8/2000 | Rubin et al. | 375/130 |
| 6,246,767 | B1 | | 6/2001 | Akins, III et al. | |
| 2002/0188567 | A1 | | 12/2002 | Candelore | 705/51 |
| 2002/0194613 | A1 | | 12/2002 | Unger | 725/118 |
| 2002/0196939 | A1 | | 12/2002 | Unger et al. | 380/216 |
| 2003/0016949 | A1 | | 1/2003 | Unger | 386/94 |
| 2003/0021412 | A1 | | 1/2003 | Candelore et al. | 380/217 |
| 2003/0026423 | A1 | * | 2/2003 | Unger et al. | 380/217 |
| 2003/0046686 | A1 | | 3/2003 | Candelore et al. | 725/31 |
| 2003/0081776 | A1 | | 5/2003 | Candelore | 380/200 |

FOREIGN PATENT DOCUMENTS

| | | | |
|---|---|---|---|
| EP | 0 723 371 | A | 7/1996 |
| EP | 0 752 786 | A | 1/1997 |
| WO | WO 94/13107 | A | 6/1994 |
| WO | WO 95/29560 | A | 11/1995 |

OTHER PUBLICATIONS

Scientific-Atlanta, Inc. Pending Application Serial #Unknown, Filing Date: Jun. 25, 2003, Title: "Method for Partially Encrypting Program Data," Inventors: Anthony J. Wasilewski and Howard G. Pinder.

Scientific-Atlanta, Inc. Pending U.S. Appl. No. 10/602,986, filed Jun. 25, 2003, Title: "Method for Partially Encrypting Program Data," Inventors: Anthony J. Wasilewski and Howard G. Pinder.

Scientific-Atlanta, Inc. Pending U.S. Appl. No. 10/602,988, filed Jun. 25, 2003, Title: "Method for Partially Encrypting Program Data," Inventors: Anthony J. Wasilewski and Howard G. Pinder.

ISO/IEC 13818-1, "Information Technology—Generic Coding of Moving Pictures and Associated Audio Systems," Draft of: Nov. 13, 1994.

ISO/IEC JTC1/SC29/WG11, "Universal Multi-Program Multiplex and Transport for MPEG-2 Systems," Jan. 1993.

ISO/IEC JTC1/SC29/WG11, "An MGEG-2 Multi-Program Multiplex Syntax," Jan. 1993.

ISO/IEC JTC1/SC2/WG11, "Requirements and Method for High-Level Multiplexing of MPEG and Other Digital Service Bitstreams with Universal Transport Layer," Nov. 1992.

Whitfield, Diffie, "Authentication and Authenticated Key Exchanges," Designs, Codes and Cryptography, An International Journal, vol. 2, No. 2, Jun. 1992, pp. 107-125.

Schneier, Bruce, "Applied Cryptography Second Edition: Protocols, Algorithms and Source Code in C," pp. 357-363.

Menezes, Alfred J., "Handbook of Applied Cryptography," pp. 506-525.

TM-1244 Rev. 4, "Final Technical Report of the Conditional Access Specialist Group," Nov. 17, 1994.

Coutrot et al., "A Single Conditional Access System for Satellite-Cable and Terrestrial TV," IEEE Transactions on Consumer Electronics, vol. 35, No. 3, Aug. 1989, pp. 464-468.

Louis Claude Guillou and Jean-Luc Giachetti, "Encipherment and Conditional Access," SMPTE Journal, 103 Jun. (1994), No. 6, White Plains, NY.

* cited by examiner

*Primary Examiner*—Ayaz Sheikh
*Assistant Examiner*—Longbit Chai

(57) ABSTRACT

The present invention is directed towards providing a partial dual-encrypted stream in a conditional access overlay system. The headend equipment includes an aligner, identifier, and remapper (AIR) device (615) that receives a clear stream and one or two encrypted streams, where the two encrypted streams have been encrypted by two different encryption schemes. The AIR device (615) identifies critical packets associated with the clear stream and subsequently allows two encrypted streams to pass and drops the critical packets of the clear stream. A multiplexer (640) then combines a percentage of the non-critical packets of the clear stream and the critical packets of the two encrypted streams to provide the partial dual-encrypted stream.

20 Claims, 8 Drawing Sheets

500

| | Program (P1) | Program (P2) | • • • | Program (Pn) |
|---|---|---|---|---|
| Video PID | 100 | 200 | | 400 |
| Audio PID | 110 | 210 | | 410 |
| Other PID | 120 | 220 | | 420 |

METHODS AND APPARATUS FOR PROVIDING A PARTIAL DUAL-ENCRYPTED STREAM IN A CONDITIONAL ACCESS OVERLAY SYSTEM

CROSS REFERENCE TO RELATED APPLICATIONS

The present application is a continuation-in-part of co-pending application Ser. No. 10/602,986 entitled "Method for Partially Encrypting Program Data" filed Jun. 25, 2003, which was filed simultaneously with applications Ser. No. 10/602,988 and 10/602,987, which were a continuation of application Ser. No. 09/930,901 filed Aug. 16, 2001, now U.S. Pat. No. 6,937,729 which is a continuation of application Ser. No. 09/487,076, filed Jan. 19, 2000, now U.S. Pat. No. 6,292,568, which is a continuation of application Ser. No. 09/126,783, filed Jul. 31, 1998, presently abandoned, which claims the benefit of U.S. Prov. App. No. 60/054,575, filed Aug. 1, 1997; and is a CIP of application Ser. No. 09/111,958, filed Jul. 8, 1998, now abandoned, which claims the benefit of U.S. Prov. App. No. 60/054,578, filed Aug. 1, 1997; and is CIP of application Ser. No. 08/767,535, filed Dec. 16, 1996, now U.S. Pat. No. 6,005,938; and is a CIP of application Ser. No. 08/580,759 filed Dec. 29, 1995, now U.S. Pat. No. 5,870,474, which claims the benefit of U.S. Prov. App. No. 60/007,962, filed Dec. 4, 1995; and is CIP of application Ser. No. 08/415,617, filed Apr. 3, 1995, now U.S. Pat. No. 5,742,677.

The present application descends from an application, which was one of seven original applications with identical Detailed Descriptions. All of these applications have the same filing date and the same assignee. The serial numbers and filing dates of the six applications follow:

Ser. No. 09/127,352, filed Jul. 31, 1998, presently abandoned, for which a continuation Ser. No. 09/488,230 was filed on Jan. 20, 2000, which issued as U.S. Pat. No. 6,252,964, and continuation Ser. No. 09/811,085 was filed on Mar. 16, 2001, which issued as U.S. Pat. No. 6,516,412, and continuation Ser. No. 10/287,913 was filed on Nov. 5, 2002, currently pending;

Ser. No. 09/126,921, filed Jul. 31, 1998, which issued as U.S. Pat. No. 6,157,719, for which a continuation Ser. No. 09/135,615 was filed on Aug. 18, 1998, which issued as U.S. Pat. No. 6,424,714;

Ser. No. 09/127,273, filed Jul. 31, 1998, presently abandoned, for which a continuation Ser. No. 09/493,409 was filed on Jan. 28, 2000, which issued as U.S. Pat. No. 6,560,340, and for which continuation Ser. No. 10/377,416 was filed on Mar. 3, 2003, which is currently pending;

Ser. No. 09/127,152, filed Jul. 31, 1998, presently abandoned, for which a continuation Ser. No. 09/488,104 was filed on Jan. 20, 2000, which issued as U.S. Pat. No. 6,246,767; for which continuation Ser. No. 09/748,313 was filed on Dec. 26, 2000, which issued as U.S. Pat. No. 6,526,508; and for which continuation Ser. No. 09/881,428 was filed on Jun. 14, 2001, currently pending;

Ser. No. 09/126,888, filed Jul. 31, 1998, presently abandoned, for which a continuation Ser. No. 09/464,794 was filed on Dec. 16, 1999, which issued as U.S. Pat. No. 6,424,717; and Ser. No. 09/126,795, filed Jul. 31, 1998, which issued as U.S. Pat. No. 6,105,134.

FIELD OF THE INVENTION

The present invention relates generally to the field of encrypted streams in a communications system, and more specifically towards methods and apparatus for transmitting dual encrypted streams in a communications system.

BACKGROUND OF THE INVENTION

The control of the content is important in order to protect the programming from, for example, nonpaying customers. A conventional communications system, such as a cable television system, therefore, typically applies an encryption scheme to television content in order to prevent unrestricted access. Once a system operator chooses an encryption scheme, the operator installs all of the necessary headend equipment (e.g., Scientific-Atlanta's conditional access software and equipment). The devices (set-tops) located at the subscriber's premises must be compatible with the encryption scheme in order to decrypt the content for viewing. Due to the proprietary systems, however, an operator is prevented from installing different set-tops that do not have the proper decryption scheme. If the operator wishes to install different set-tops that decrypt a different conditional access system, the operator would also have to install a second proprietary system to overlay the incumbent system in order to use both boxes.

It would be to the operator's advantage to be able to choose boxes from any manufacturer and easily implement different encryption schemes in the system without duplicating the headend equipment and utilizing extra bandwidth. Some have attempted to address a technique that overlays two encryption schemes in a system. The present application is directed towards improvements to and alternative embodiments of a conditional access system that enables different proprietary set-tops that decrypt content that has been encrypted by different encryption schemes.

BRIEF DESCRIPTION OF THE DRAWINGS

FIG. 8 provides an example table illustrating the single programs that may be provided to an output port of demultiplexers.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

The present invention is directed towards a partial dual encryption scheme. Methods and apparatus are described that provide a transport stream including a clear stream and dually-encrypted streams. The present invention allows for two different set-tops (i.e., an incumbent set-top and an overlay set-top) to be located in a single system. Each set-top is designed to decrypt a proprietary encryption scheme. Advantageously, the present invention is accomplished without duplicating all of the headend equipment, and without consuming twice the original bandwidth. It will be appreciated that the incumbent set-tops remain unchanged and are simply conventional devices that are most likely already deployed in the system.

A clear multiprogram transport stream (MPTS) is provided to a headend facility. It will be appreciated that the clear MPTS includes several streams of unencrypted programs each including video, audio, and data packets. The packets each have a packet identifier (PID). Typically, an encryption scheme encrypts some or all of the packets (herein referred to as critical packets) of some or all of the programs depending upon the level of desired security. Further information regarding a conditional access system can be found in U.S. patent application Ser. No. 10/602,986 entitled "Method for Partially Encrypting Program Data" filed Jun. 25, 2003 and U.S. Pat. No. 6,424,717 entitled "Conditional Access System" filed Dec. 16, 1999, which are commonly assigned, the disclosure and teachings of which are hereby incorporated by reference.

Figure 1:
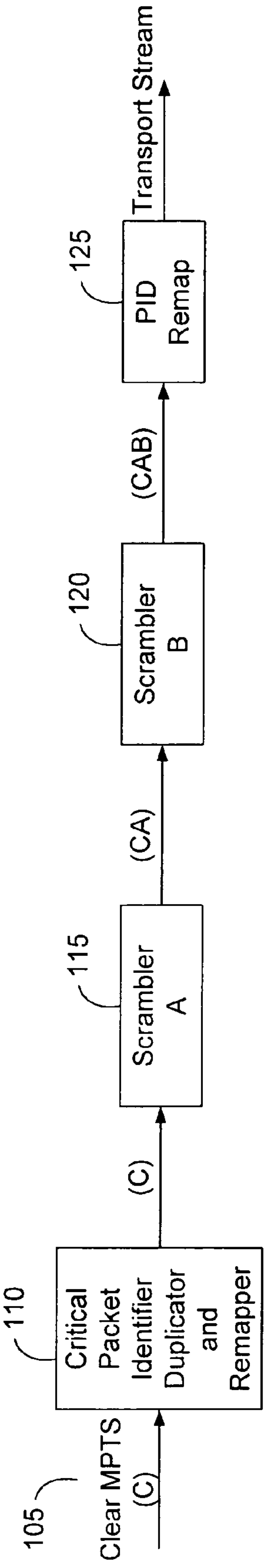
FIG. 1 is a block diagram of a prior art dual encryption process.
Figure 2:
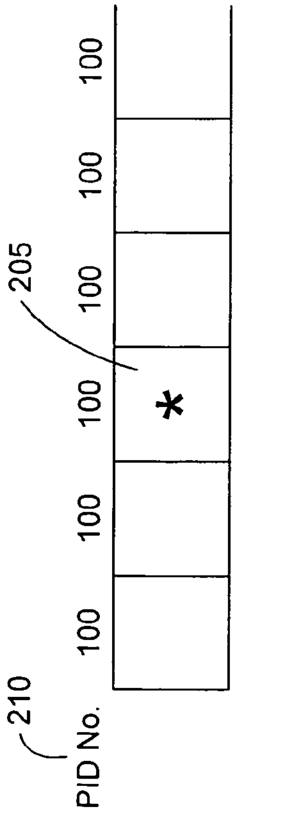
FIG. 2 is an illustration of a program including a critical packet.
Figure 3:
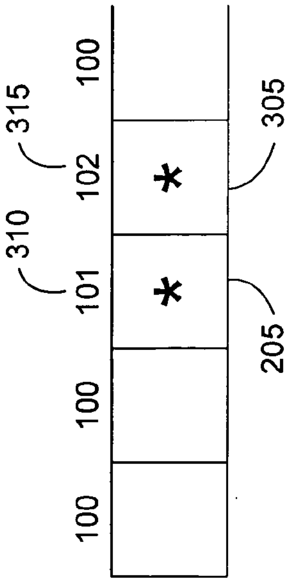
FIG. 3 is an illustration of the critical packet and the duplicated packet of FIG. 2.

FIG. 1 is directed towards a dual encryption scheme, and is taught in U.S. Pat. Application Publication No. US 2003/0026423 A1 by Unger. A clear stream 105 is provided to a critical packet identifier, duplicator, and remapper device (IDR) 110. The identifier device 100 identifies a critical packet in a program. FIG. 2 is an illustration of a stream including a critical packet 205 having a PID no. 210 (e.g., PID 100). The predetermined critical packet 205 is identified from the stream and duplicated. FIG. 3 is an illustration of the critical packet and the duplicated packet of FIG. 2. The IDR 110 of FIG. 1 then remaps the two critical packets (i.e., the critical packet 205 and the duplicated packet 305) to have differing PID values 310, 315. If, for example, the PID has an original value of 100, the IDR 100 may remap the critical packet 205 to have a PID value of 101 (310) and the duplicated packet 305 to have a PID value of 102 (315). It is also noted that the duplicated packet 305 is placed immediately following the critical packet 205 as taught by Unger.

Referring again to FIG. 1, Scrambler A 115 is then programmed to detect the PID values of the critical packets (e.g., PID 101) and scramble them with a first encryption scheme. Scrambler B 120 then detects the duplicated packets having the remapped PID value (e.g., PID 102) and scrambles them according to a second encryption scheme. The transport stream including the clear stream (C) and the two encryption streams (A and B) are subsequently provided to a PID remapper 125. The PID remapper 125 remaps the clear stream (C) to have the same PID value as the first encryption stream A (e.g., PID 100 to PID 101). The transported stream may then include, for example, a percentage, such as 98%, of the clear stream C and a percentage, such as 2%, of both of the encrypted streams A and B. In this manner, an incumbent set-top, which is designed to decrypt encryption scheme A, receives 98% of the clear stream and 2% of the encrypted stream A. The remaining 2% of the encrypted stream B is simply not processed and discarded.

There are, however, several disadvantages with the teachings of Unger. More specifically, Unger relies on controlling the incumbent headend encryption equipment to the level of specifying exactly which PIDs to encrypt, which would be extremely difficult to accomplish in some existing encryption systems. For example, a Scientific-Atlanta encryption system, as described in U.S. Pat. No. 6,424,717, does not provide a control interface to encrypt a specific PID. The encryption schemes are performed at the program level and would require extensive recreations of a program mapping table and its associated sessions. In contrast, the present invention does not require any changes to the incumbent headend equipment or require any special control. More specifically, the present invention simply utilizes the output of the existing headend equipment without modifications. Another disadvantage, is that the teachings of Unger require two operations on the clear stream by the overlayed headend equipment; specifically, a first time for the critical packet selection and again for the PID remapping. The present invention, however, only processes the streams once using one piece of equipment. Advantageously, this is an improvement that reduces the cost and the complexity of the system.

A further advantage of the present invention is that modification of the encryption percentage is accomplished as a function of available bandwidth in the system. For example, if there is additional bandwidth available, the present invention can increase the encrypted percentage from, for example, 2% to 6%. Notably, this feature is important to the system operators who need to be sensitive of both the required bandwidth and the security level of the programs.

Figure 4:
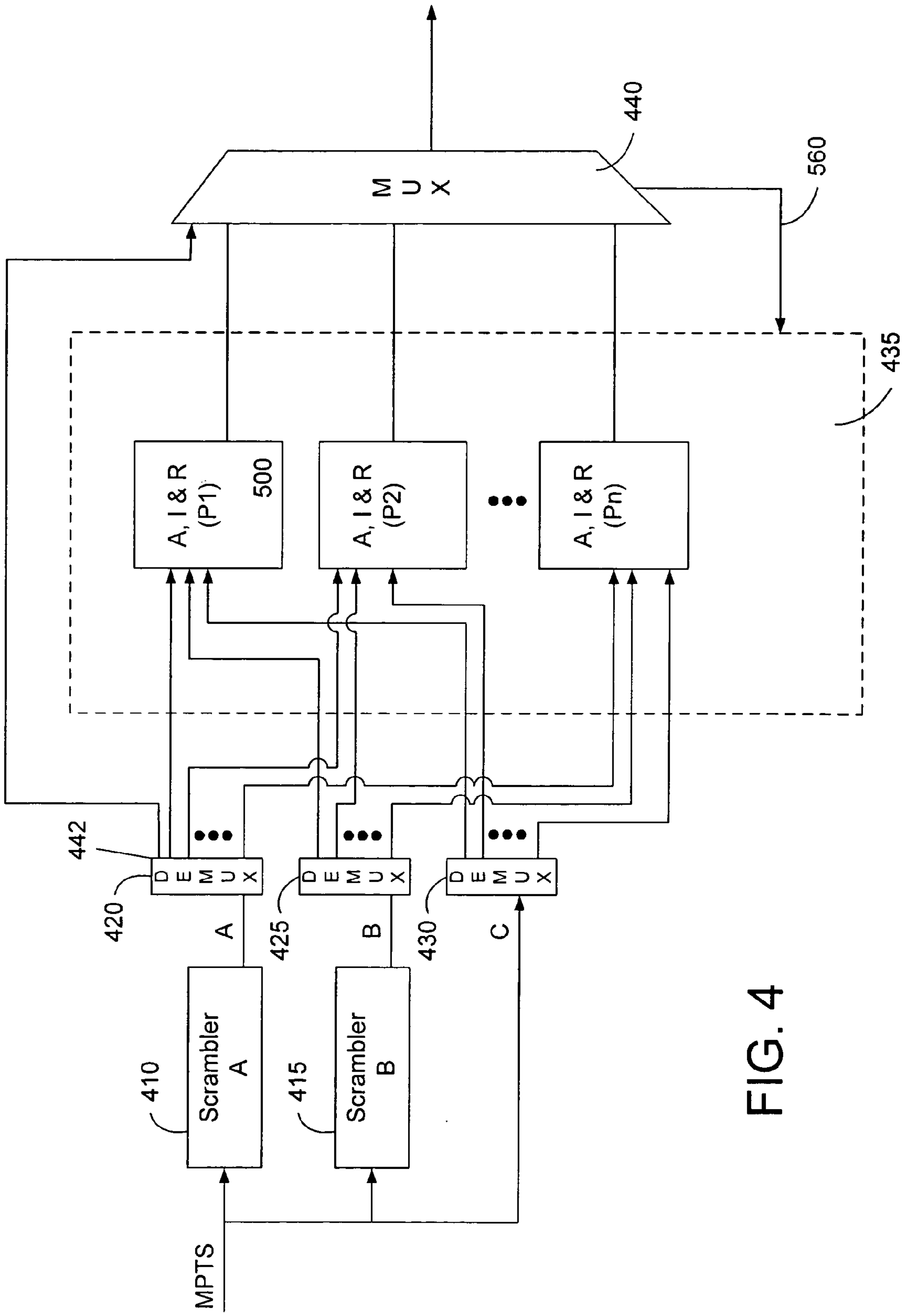
FIG. 4 is a block diagram of a first embodiment of a dual encryption scheme in accordance with the present invention.

Referring now to FIG. 4, a block diagram is illustrated depicting a first embodiment of a partial dual encryption scheme in accordance with the present invention. An MPTS, which is a clear stream C that includes a plurality of programs, is provided to scrambler A 410 and scrambler B 415. Scrambler A 410 and scrambler B 415 encrypts the clear stream C and respectively provides encrypted stream A and encrypted stream B. In a typical application, scrambler A 410 is the existing scrambler of the incumbent encryption scheme, and scrambler B is the additional scrambler required for the additional encryption scheme. A demultiplexer 420 is coupled to scrambler A 410 to demultiplex the encrypted stream A, which as mentioned includes a combination of programs, to provide a single program to a single output port. Similarly, demultiplexers 425 and 430 demultiplex the programs to provide the same single programs to an output port.

FIG. 8 provides an example table illustrating the single programs that may be provided to an output port of the demultiplexers 420, 425, 430 for further processing. For example, a first Program P1 805, which may include video PID 100, audio PID 110, and other PID 120, (which may be a data PID or second audio PID), may be sent to a first output port of demultiplexers 420, 425, 430. Similarly, a second Program P2 810, which may include video PID 200, audio PID 210, and other PID 220, may be sent to a second output port of demultiplexers 420, 425, 430. It will be appreciated that there can be any number of programs that can be provided to an output port.

Referring again to FIG. 4, an aligner, identifier, and remapper (AIR) device 435 receives the programs from the output ports of the demultiplexers 420, 425, 430, where the programs, or streams, (P1, P2, Pn) are,grouped at the input of the AIR device 435, and is discussed below. The output streams of the AIR device 435 are provided to a multiplexer 440 that then provides a multiplexed partial dual encrypted transport stream. Additionally, the demultiplexer 420 coupled to scrambler A, which in this embodiment is assumed to be the incumbent scrambling scheme, also includes an output port 442 that provides undefined packets directly to the multiplexer 440. Due to the fact that there may be packets that are intended for purposes that are specific to the incumbent set-tops, these packets should be allowed to continue through the system without any potential alterations or deletion.

Figure 5:
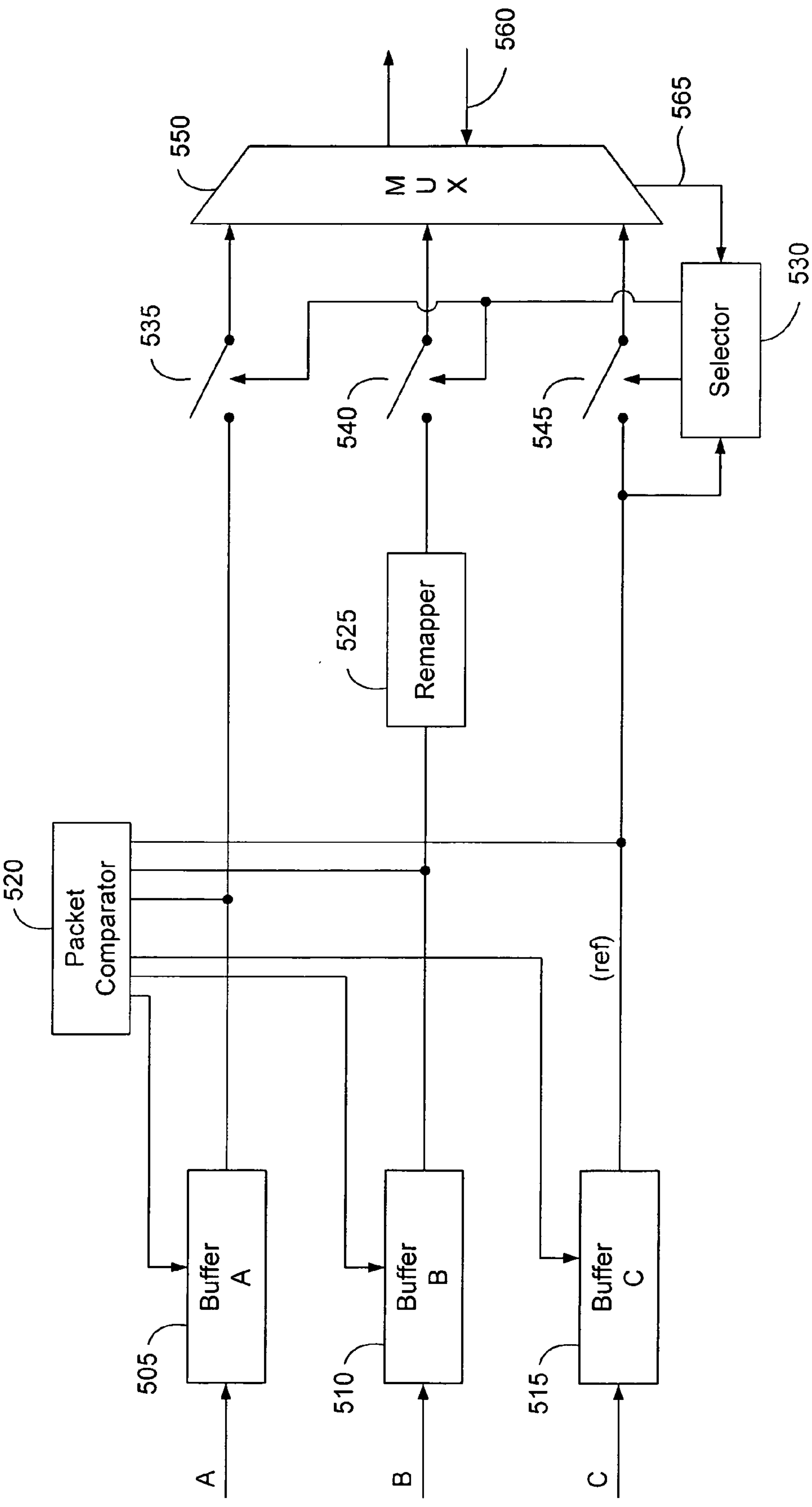
FIG. 5 is an illustration of one program aligner, identifier, and remapper (AIR) device in accordance with the present invention that is suitable for use in an AIR device of FIG. 4.

FIG. 5 is an illustration of one program aligner, identifier, and remapper (AIR) device 500 in accordance with the present invention that is suitable for use in the AIR device 435 of FIG. 4. It will be appreciated that the present invention in comparison with the prior art does not duplicate or remap critical packets. Additionally, it will be appreciated that more than one program AIR device 500 can be implemented in the AIR device 435 depending upon the number of programs (e.g., P1, P2, Pn) to be processed. Buffer A 505, buffer B 510, and buffer C 515 receive the streams A, B, and C from the output the demultiplexers 420, 425, 430. The buffers 505, 510, 515 allow a packet comparator 520 to monitor the streams A, B, and C and align them in time. Alignment may be necessary since the encrypted streams A and B may be somewhat delayed and out of synchronization due to the scramblers 410, 415.

Figure 9:
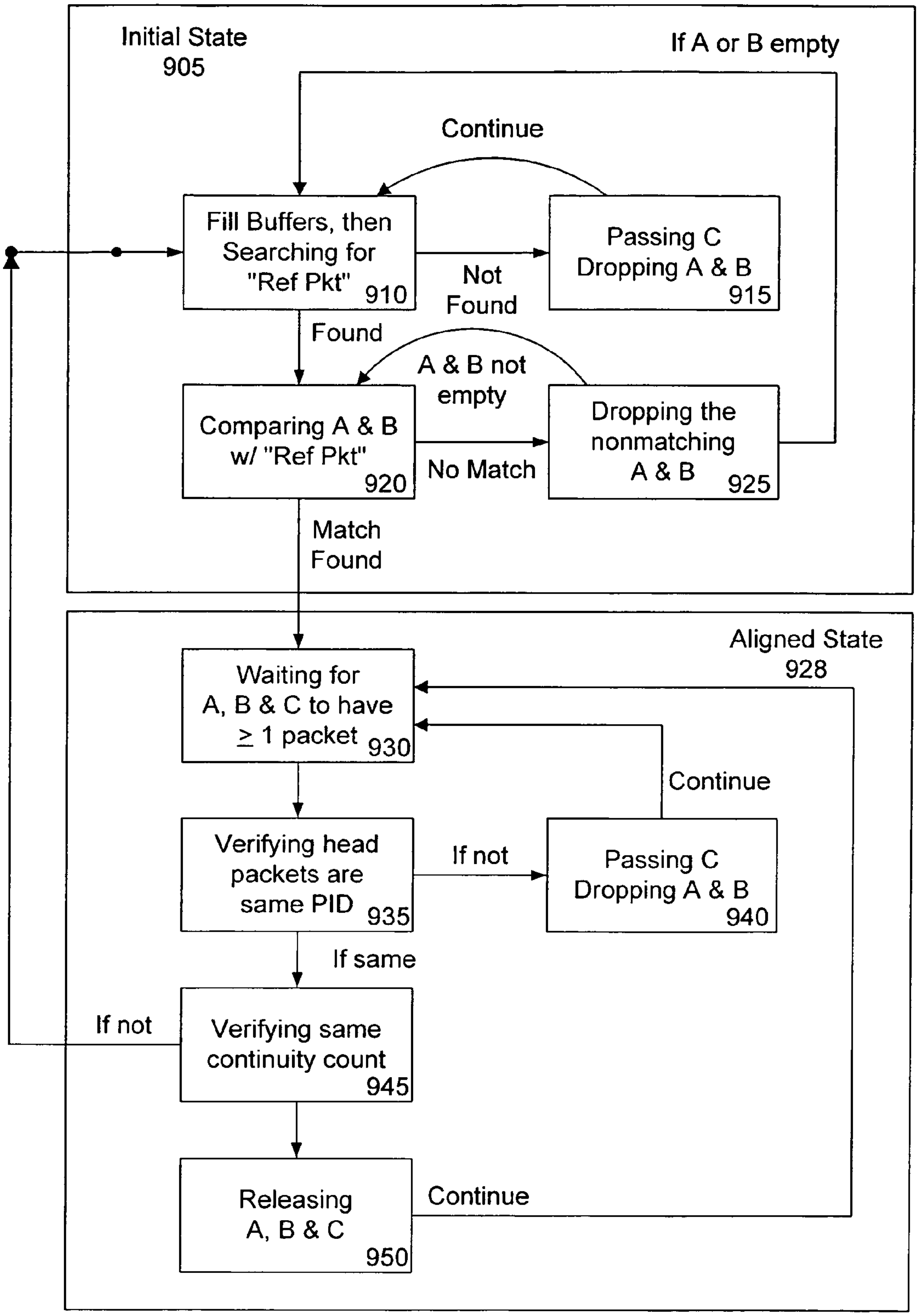
FIG. 9 is a state diagram illustrating the comparing of the packets by the packet comparator of FIG. 5.

FIG. 9 is a state diagram illustrating the comparing and aligning of the packets by the packet comparator 520. In the initial state 905, the buffers 505, 5 10, 515 are filled with packets, and the packet comparator 520 begins searching, in state 910, for a reference packet (ref pkt) in the clear stream, which is provided by buffer C 515. The reference packet may be, for example, a video PID with a payload_unit_start_indicator (PUSI) bit equal to one (1). It will be appreciated that the specifications for this reference packet may have other specifications, such as an audio PID and the PUSI bit may be equal to 0. The basis for comparison however must be valid for packets in the clear or scrambled state. Further information regarding the PUSI bit can be found in U.S. Pat. No. 6,424,714 entitled "Conditional Access System." If the reference packet is not found, the clear stream C passes, and the encrypted streams A and B drop in state 915. The searching state 910 continues until the reference packet is found in the clear stream C. Subsequently, in state 920, the encrypted streams A and B are compared to the found reference packet. The basis for comparison is again the video PID, and the presence of the PUSI bit equal to one (1). The basis for comparison is not affected by the fact that scrambler A 410 or B 415 has scrambled the packet. If the packets in either of the streams A and B do not match, the non-matching packet(s) drop in state 925. If buffers A 505 and B 510 are empty, the state returns to state 910 and begins searching. Otherwise, state 920 continues comparing the packets in streams A and B with the reference packet until a match is found, and the streams are then considered aligned.

In the aligned state 928, state 930 waits until buffers A 505, B 510, and C 515 have greater than one packet. Subsequently, the head packets are verified to have the same PID value, in state 935. If not, in state 940, the packet in stream C passes and packets in streams A and B drop, and state 935 continues verifying the packets. At times, packets in a program can be swapped in their position and are essentially out of order. In that case, passing the packets in the clear stream C ensure that the packets are passed rather than stalling in the buffers. If the head packet PID values are the same, the values of the continuity_counter field of the packets are then verified to be the same, in state 945. If not, the assumption is that there is an error in the alignment, and the comparator 520 returns to the initial state 905. It will be appreciated that the continuity counter of the clear stream C is used as the reference number. If the continuity counters are the same for the all the packets in the streams, state 950 releases the packets from the buffers A, B, and C, and returns to the aligned state 930 to continue ensuring alignment of the packets. It will be appreciated that there are other methods for verifying alignment, other than the use of the continuity_count value, such as the presence and length of an adaptation_field, or the presence and value of a program_clock_reference (PCR) value.

It should be noted that MPEG packet processing equipment typically modifies the Program Clock Reference (PCR) of programs being processed, to correct for any PCR jitter that would otherwise be introduced. In this embodiment, the PCRs of clear stream C are regarded as the primary PCRs, and all PCR modifications are performed on the values in stream C. If the PCR-bearing packet is also a critical packet, the corrected PCR value from stream C is placed into the PCR field in the packet from streams A and B.

Referring again to FIG. 5, a remapper 525 remaps the PID value of the released packet from stream B to a new PID value, for example, PID 100 to PID 101 and/or PID 110 to PID 111, depending upon whether the critical packet selection includes just video or audio packets or includes both video and audio packets. A switch 535, 540, 545 then gates the released packets of stream A, B, and C.

A selector 530 also receives the released packet of clear stream C, which it uses as a reference stream to control the switches 535, 540, 545. In the preferred embodiment of the present invention, the selector 530 allows the packets of the clear stream C to pass through to a multiplexer 550 until such time as a critical packet is detected. Again, it will be appreciated that the critical packet can be a video, audio, and/or data packet. When the critical packet is detected, the switch 545 opens and switches 535, 540 are closed, thereby allowing the released packets of encrypted streams A and B, which each have the aligned critical packet, to simultaneously pass through to the multiplexer 550. The multiplexer 550 then combines the packets to provide a partial dual-encrypted transport stream where the dual encryption includes packets encrypted by both scrambler A 410 and scrambler B 415. The multiplexed stream is then provided to multiplexer 440 (FIG. 4) to be combined with additional partial dual-encrypted program streams. It will be appreciated that multiplexer 550 provides only a portion of the packet stream to the overall multiplexer 440 of FIG. 4. In this manner, when bandwidth becomes available in multiplexer 440, a signal indicating an increase in encrypted packets is allowable is provided to multiplexer 550 via feedback loop 560. The multiplexer 550 then relays this information to the selector 530 via feedback loop 565, and the selector 530 can then increase the percentage of critical packets, for example, from 2% to 6% of the packets that are considered critical.

Figure 6:
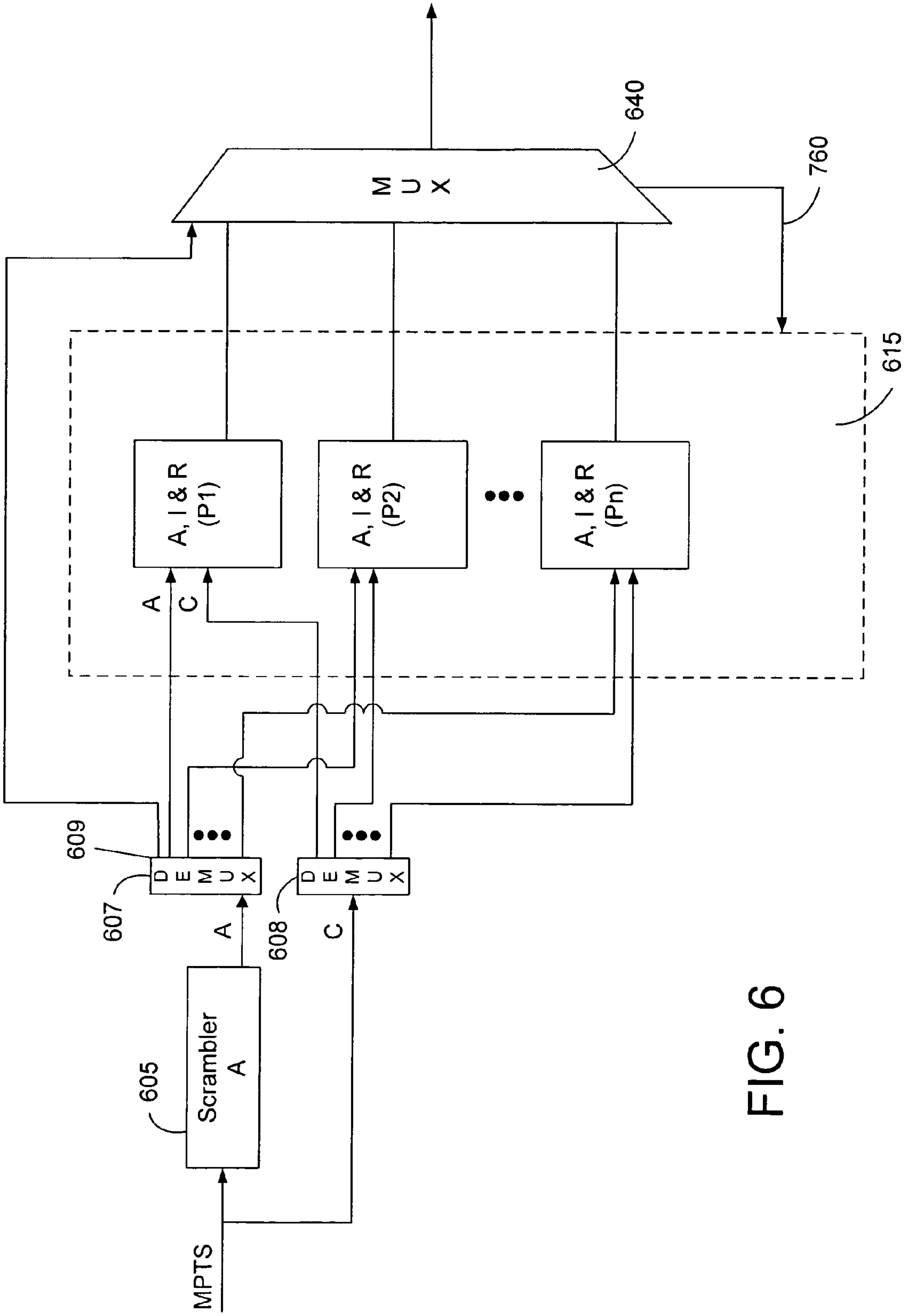
FIG. 6 is an illustration of a second embodiment of a dual encryption scheme in accordance with the present invention.

FIG. 6 is an illustration of a second embodiment of a partial dual encryption scheme in accordance with the present invention. The advantage of the configuration shown in FIG. 6 is that all the elements required to add an additional encryption scheme (Demux 607, 608, AIR devices 615, and Mux 640) can be implemented in a single piece of equipment. An MPTS C is provided to scrambler A 605 that provides a first encrypted stream A. A first demultiplexer 607 receives the encrypted stream A and a second demultiplexer 608 receives the clear stream C in order to demultiplex the plurality of programs into single programs. Again, assuming the scrambler A 605 is the incumbent encryption scheme, an output port 609 of the demultiplexer 607 is provided for unidentified packets and is provided directly to a multiplexer 640 for delivery along with the partial dual-encrypted transport stream. The common programs from the demultiplexers 607, 608 are then provided to an aligner, identifier, and remapper (AIR) device 615.

Figure 7:
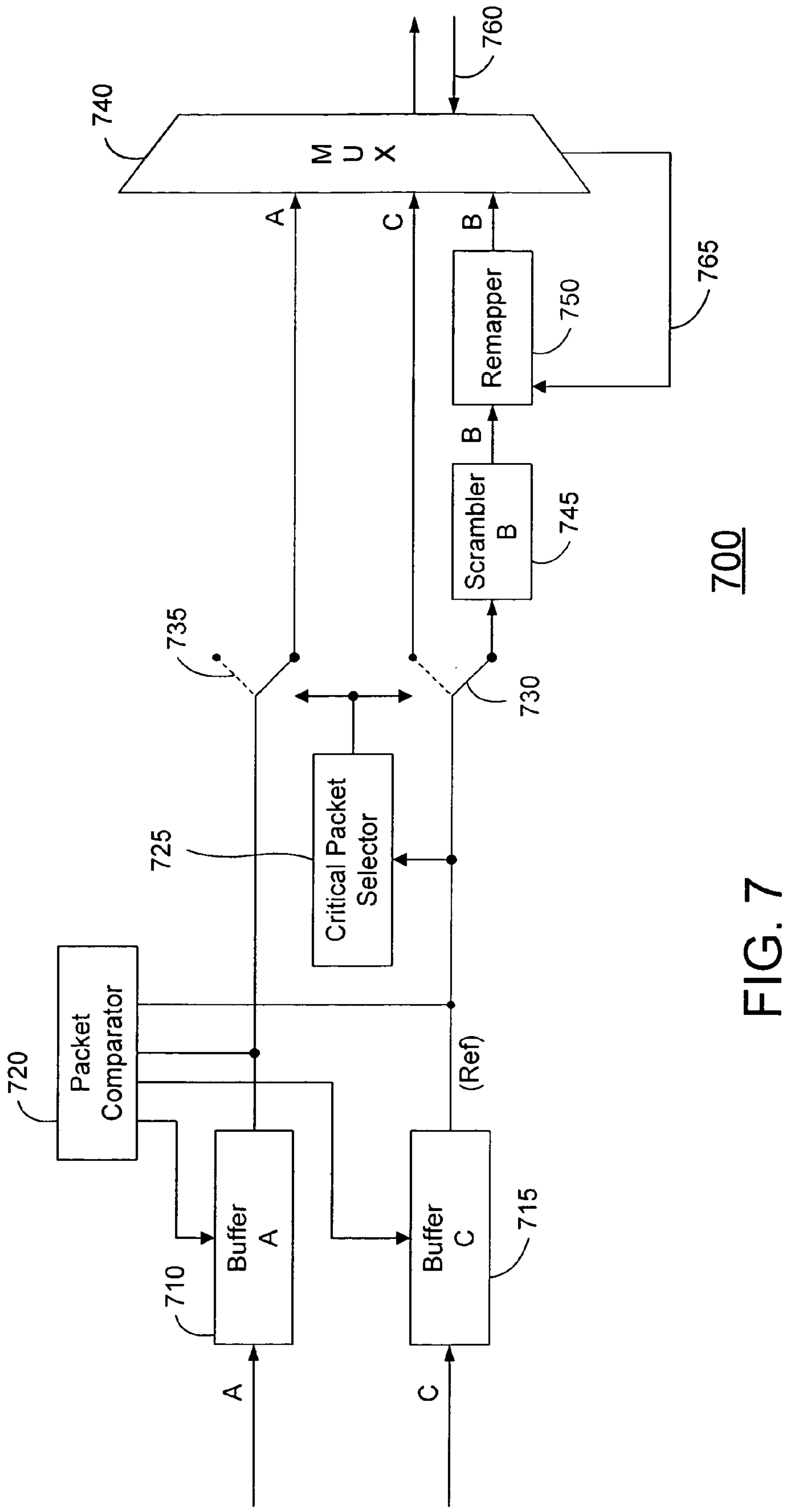
FIG. 7 is an illustration of one program aligner, identifier, and remapper (AIR) device in accordance with the present invention that is suitable for use in the AIR device of FIG. 6.

FIG. 7 is an illustration of one program aligner, identifier, and remapper (AIR) device 700 in accordance with the present invention that is suitable for use in the AIR device 615 of FIG. 6. For a first program PI, the encrypted stream A is buffered in buffer A 710, and buffer C 715 receives the clear stream C. A packet comparator 720 compares the packets to ensure they are aligned due to any delays introduced by scrambler A 705. It will be appreciated that the packet comparator 720 operates in a similar manner to the packet comparator 520 of FIG. 5 and in accordance with the state diagram of FIG. 9 for just encrypted stream A. A critical packet selector 725 uses the clear stream C as a reference stream and controls two switches 730, 735 accordingly. More specifically, switch 730 allows the packets of clear stream C to pass through to a multiplexer 740 until a critical packet is detected. When the critical packet is detected, switch 730 provides the packet of clear stream C to scrambler B 745 and switch 735 is also switched, thereby allowing the critical packet of encrypted stream A to pass through to the multiplexer 740. The scrambler B 745 encrypts the packet of clear stream C according to a second encryption method and provides the encrypted packet to a PID remapper 750. The PID remapper 750 remaps the packet's PID value to a new PID value (e.g., PID 100 to PID 101 and/or PID 110 to 111). The remapped packet is subsequently provided to the multiplexer 740 for transmitting along with the packet of the encrypted stream A. The scrambler B 745 also controls the PID comparator 720 in order to prevent packets from being transmitted until the scrambler B 745 and the remapper 750 have completed their steps, thereby maintaining proper ordering of packets.

A partial dual-encrypted transport stream is then provided to the muliplexer 640 (FIG. 6) to be combined with other partial dual-encrypted programs. The combined partial dual-encrypted transport stream is then provided to the set-tops and decrypted according to the decryption methods (i.e., encryption method A or encryption method B) of the set-top. Similar to the first embodiment of the present invention, multiplexer 740 provides only a portion of the packer steam to the overall multiplexer 640 of FIG. 6. In this manner, when bandwidth becomes available in multiplexer 640, a signal indicating an increase in encrypted packets is allowable is provided to multiplexer 740 via feedback loop 650. The multiplexer 740 the relays this information of the remapper 750 via feedback loop 765, and the remapper 750 can then increase the percentage of critical packets, for example, from 2% to 6% of the packets that are considered critical.

It will be appreciated that modifications can be made to the two embodiments that are still within the scope of the invention. Additionally, the present invention can be implemented using hardware and/or software that are within the scope of one skilled in the art. The embodiments of the description have been presented for clarification purposes; however, the invention is defined by the following claims.

What is claimed is:

1. A method for providing an encrypted transport stream, the method comprising the steps of:

receiving a clear stream, the clear stream including a plurality of programs, each program comprising a plurality of packets each having a packet identifier (PID), wherein at least one of the plurality of packets is designated a critical packet;

scrambling the clear stream according to a first encryption method to provide a first encryption stream;

scrambling the clear stream according to a second encryption method to provide a second encryption stream;

aligning in time the clear stream, the first encryption stream, and the second encryption stream;

after scrambling the clear stream according to the first encryption method to provide the first encryption stream and after scrambling the clear stream according to the second encryption method to provide the second encryption stream, passing packets of the clear stream through a multiplexer, wherein when the at least one critical packet is identified in the packets of the clear stream, the critical packet of the clear stream drops and the scrambled critical packets included in the first and second encryption streams pass; and multiplexing the packets of the clear stream and the critical packets of the first and second encryption streams to provide a partial dual encrypted stream.

2. The method of claim 1, the steps further comprising remapping at least one PID value associated with the second encryption stream, whereby the scrambled packets of the first and second encryption streams each have a differing PID value.

3. The method of claim 1, wherein the aligning step comprises buffering each of the clear stream, the first encryption stream, and the second encryption stream.

4. The method of claim 3, the aligning step comprising the further steps of:

searching the clear stream for a reference packet; and comparing the reference packet with packets in the first encryption stream and the second encryption stream, wherein the packets associated with the clear stream passes and the packets associated with the first and second encryption streams drop until the packets associated with the first and second encryption stream match the reference packet.

5. The method of claim 1, comprising the further step of demultiplexing each of the clear stream and the first and second encryption streams to provide a plurality of programs.

6. The method of claim 5, wherein a common program demultiplexed from each stream is provided to a common aligner, identifier, and remapper device.

7. A partial dual-encryption device for encrypting a clear stream, comprising:

a port for providing a first encrypted stream corresponding to the clear stream from a first scrambler;

a port for providing a second encrypted stream corresponding to the clear stream from a second scrambler;

an aligner, identifier, and remapper (AIR) device coupled to each scrambler for providing a partial dual-encrypted stream, wherein the clear stream having at least one critical packet is provided to each scrambler and the AIR device, wherein, after the streams are encrypted, the AIR device aligns packets of the clear stream, the first encrypted stream, and the second encrypted stream, and wherein, upon identification of the at least one critical packet of the clear stream, provides the partial dual-encrypted stream including non-critical packets of the clear stream, a critical packet of the first encrypted stream, and a remapped critical packet of the second encrypted stream.

8. The partial dual-encryption device of claim 7, the AIR device comprising:

an aligner for aligning the packets associated with the clear stream, the first encrypted stream, and the second encrypted stream;

an identifier for identifying the at least one critical packet; and a remapper for remapping a packet identifier (PID) value associated with the second encrypted stream, the aligner comprising:

buffers for buffering the clear stream, the first encrypted stream, and the second encrypted stream; and a packet comparator for comparing a head packet associated with each stream in a buffer to determine when the buffered streams are aligned and subsequently releasing the streams for further processing.

9. The partial dual-encryption device of claim 8, the AIR device further comprising:

switches responsive to the identifier for allowing one of the packets associated with the clear stream and the packets associated with the first and second encrypted streams to pass through to a multiplexer.

10. The partial dual-encryption device of claim 7, further comprising:

a first demultiplexer coupled to the first scrambler to provide a plurality of first encrypted program streams;

a second demultiplexer coupled to the second scrambler to provide a plurality of second encrypted program streams; and a third demultiplexer for providing a plurality of clear program streams, wherein the demultiplexed program streams are provided to the AIR and processed as a common program.

11. The partial dual-encryption device of claim 10, wherein the AIR device includes a plurality of program AIR devices depending upon the number of common programs.

12. The partial dual-encryption device of claim 11, further comprising a common multiplexer for multiplexing the partial dual-encrypted stream from each of the plurality of program AIR devices.

13. The partial dual-encryption device of claim 12, wherein the common multiplexer provides feedback to each of the program AIR devices that indicates availability of bandwidth for when the number of critical packets of the first encrypted stream and the remapped critical packets of the second encrypted stream can be increased.

14. A method for transmitting an encrypted transport stream, the method comprising the steps of:

receiving a clear stream, the clear stream including a plurality of programs, each program comprising a plurality of packets each having a packet identifier (PID), wherein at least one of the plurality of packets is designated a critical packet;

scrambling with a first scrambler the clear stream according to a first encryption method to provide a first encrypted stream;

aligning in time the clear stream and the first encrypted stream;

after providing the first encryption stream, identifying the at least one critical packet associated with the clear stream, wherein prior to identification, packets associated with the clear stream pass to a multiplexer and encrypted packets associated with the first encrypted stream drop, and wherein subsequent to identification, packets associated with the clear stream pass to a second scrambler and encrypted packets associated with the first encrypted stream pass to the multiplexer, wherein the second scrambler provides a second encrypted stream to the multiplexer; and multiplexing non-critical packets associated with the clear stream and the encrypted critical packets associated with the first and second encrypted streams to provide a partial dual-encrypted stream.

15. The method of claim 14, the steps further comprising remapping the second encrypted stream to a new PID value.

16. A partial dual-encryption device, comprising:

a port for providing a first encrypted stream from a first scrambler;

an aligner, identifier, and remapper (AIR) device coupled to the scrambler for providing a partial dual-encrypted stream, wherein a clear stream having at least one critical packet is provided to the scrambler and the AIR device, wherein the AIR device aligns packets of the clear stream and the first encrypted stream, and identifies the at least one critical packet associated with the clear stream, wherein, upon identification of the at least one critical packet, provides the first stream having been previously encrypted, provides the at least one critical packet to a second scrambler, the second scrambler to provide a second encrypted stream, and wherein the AIR device provides the partial dual-encrypted stream including non-critical packets associated with the clear stream and dually-encrypted critical packets associated with the first and second encrypted streams.

17. The partial dual-encryption device of claim 16, the AIR device comprising:

an aligner for aligning the packets associated with the clear stream and the first encrypted stream; an identifier for identifying the a critical packet associated with the clear stream; and a first switch responsive to the identifier for providing one of the non-critical packets associated with the clear stream to a multiplexer and the critical packet associated with the clear stream to a second scrambler;

a second switch responsive to the identifier, wherein upon identification of the critical packet, the second switch for providing a first encrypted critical packet of the first encrypted stream to the multiplexer;

the second scrambler coupled to the first switch for receiving the critical packet associated with the clear stream and providing a second encrypted critical packet; and a remapper for remapping the second encrypted packet to provide a remapped encrypted critical packet.

18. The partial dual-encryption device of claim 17, the AIR device comprising:

a first demultiplexer coupled to the first scrambler to provide a plurality of first encrypted program streams; and a second demultiplexer for providing a plurality of clear program streams, wherein the demultiplexed program streams are provided to the AIR device and processed according to a common program stream.

19. The partial dual-encryption device of claim 18, wherein the AIR device includes a plurality of program AIR devices depending upon the number of common program streams.

20. The partial dual-encryption device of claim 19, further comprising a common multiplexer for multiplexing the partial dual-encrypted stream from each of the plurality of program AIR devices, wherein the common multiplexer provides feedback to each of the program AIR devices that indicates availability of bandwidth for when the number of critical packets of the first encrypted stream and the remapped encrypted critical packets of the second encrypted stream can be increased.

* * * * *